Aug. 30, 1932.   C. BUDERUS   1,875,214
CARRIAGE FOR ARTICULATED TRAINS
Filed Oct. 2, 1928   4 Sheets-Sheet 1
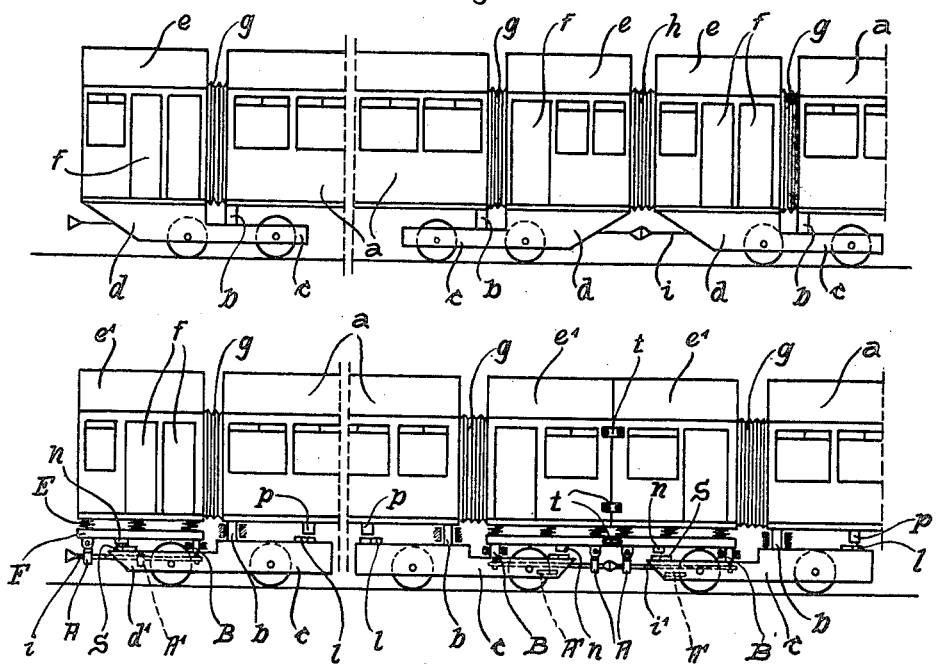
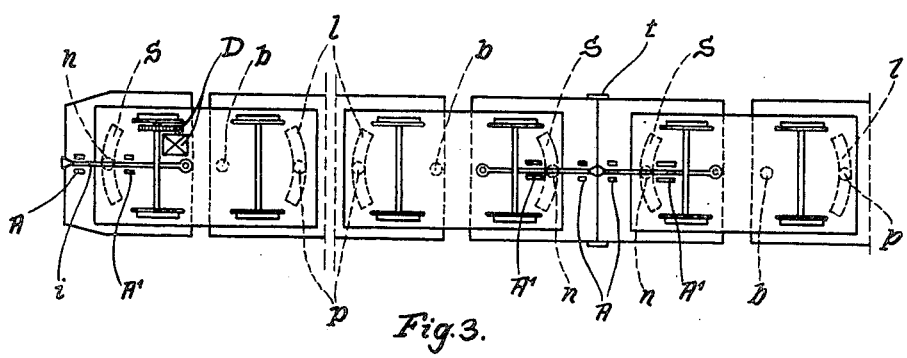
Inventor
Carl Buderus
By C. F. Wenderoth
Atty.

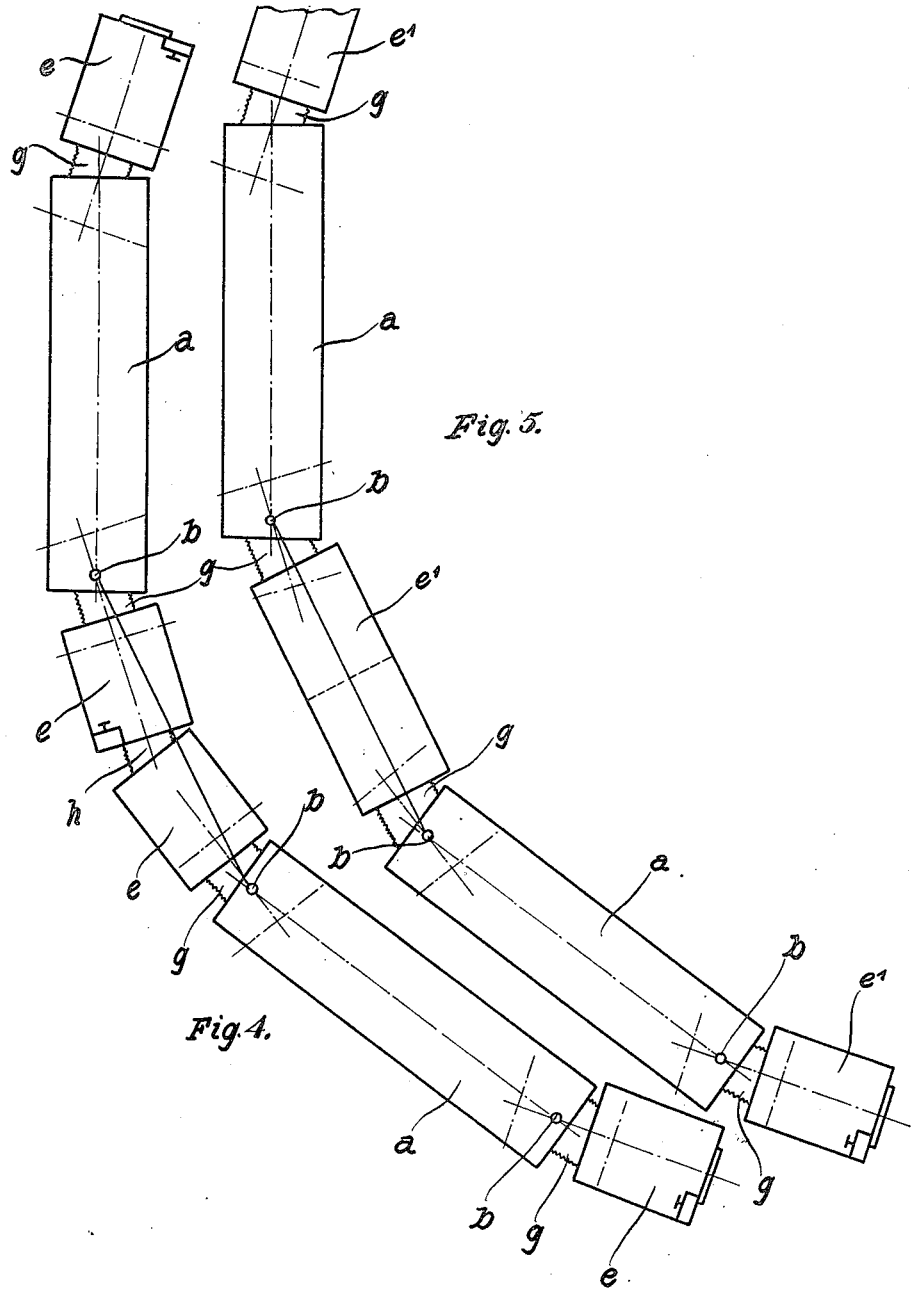

Patented Aug. 30, 1932

1,875,214

UNITED STATES PATENT OFFICE

CARL BUDERUS, OF FRANKFORT-ON-THE-MAIN-SUD, GERMANY

CARRIAGE FOR ARTICULATED TRAINS

Application filed October 2, 1928, Serial No. 309,831, and in Germany October 14, 1927.

This invention relates to a carriage for articulated trains running on rails or roads, preferably for conveying passengers, as used at present for express trains and for tramways. It has been proposed, to hingedly connect to the ends of such carriages free-projecting platforms, pivotable in a horizontal plane and constructed as carriage spaces closed at the sides and connected with the carriage by yieldable walls, such as specially flexible gangway bellows.

This invention relates to an articulated carriage composed of three parts, consisting of a central part designed exclusively for conveying passengers and of two end parts hingedly connected to the central part and designed to serve as driver's cab, entrance for the passengers, corridor and the like, and in motor-cars for carrying the driving engine.

The invention is characterized in that the outer parts of the carriage form the carriers for the central part, which might further be supported individually. The bogies of the outer carriage parts extend under the central carriage part, the ends of this central part being pivotally mounted and supported on these bogies. The outer carriage parts are rigidly or pivotally connected with their bogies and they are further fitted with flexible gangway bellows or similar devices for the connection with the outer parts of the next following carriages. The outer carriage parts of consecutive carriages might also join directly without the intermediary of gangway bellows and be coupled together by couplings to form a rigid structure.

Several embodiments of the invention are illustrated, by way of example, in the accompanying drawings, in which:—

Fig. 1 shows in side elevation two carriages according to the invention with gangway bellows between the same.

Fig. 2 shows in side elevation the top of a train consisting of two carriages, the joining outer carriage parts being pivotally mounted on their bogies and rigidly connected to form a carriage unit.

Fig. 3 is a bottom view of Fig. 2.

Fig. 4 shows in top plan view an articulated train running through a curve and composed of two carriages, as shown in Fig. 1.

Fig. 5 shows in top plan view an articulated train composed of two carriages as shown in Fig. 2, the train running through a curve.

Figure 6:
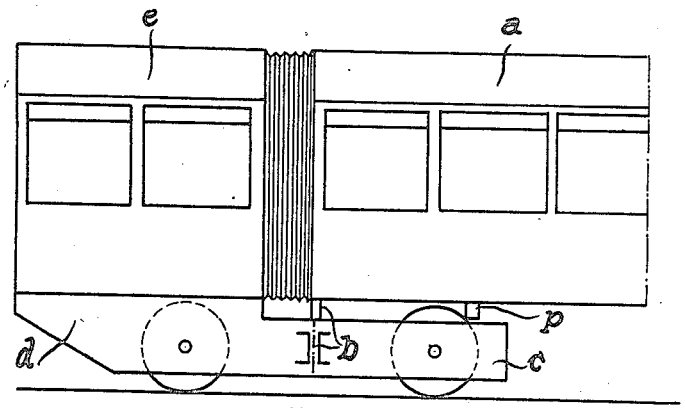
Figs. 6 to 11 show various possibilities of the connection of carriage central parts and carriage end parts.

Referring to Figs. 1 to 5 the central carriage parts $a$ are supported only by their bogies $d$ and pivotally connected with same by means of pivots $b$ on the extensions $c$ of the bogies $d$. The usual spring-supported bogies $d$ having two axles carry closed platform bodies $e$ of a similar profile as the central carriage part $a$ and have doors $f$ and the other commonly provided arrangements (steps, handles and the like) for the passengers entering the car. Between the outer carriage parts $e$ and the central carriage part $a$ intervals are left, which are bridged by flexible connections in the form of gangway bellows $g$.

In the form of construction shown in Figs. 1 and 4 an interval with gangway bellows $h$ is also arranged between the corresponding two outer car parts $e$ of two consecutive carriages. Such parts are coupled with each other by a rigid coupling rod $i$. The construction of the carriages shown in Figs. 1 and 4 is not different for motor-cars or trail-cars. The trains may be composed of any desired number of motor cars and trail cars or only of motor cars. Carriages of other construction might also be inserted in a train. The correct adjusting of the end parts $e$ of the carriage for negotiating curves is effected according to the adjusting of the bogies $d$ rigidly connected with the end parts $e$.

In the form of construction shown in Figs. 2, 3 and 5, a frame F is arranged between each cabin $e^1$ and the bogie $d^1$, which frame carries the cabin by means of suspension springs E, for a purpose to be described in the next paragraph. The carriage end parts $e^1$ with their frames F are pivotally mounted on pivots B of the bogies $d^1$. The coupling rods $i^1$ are arranged to pivot about the same axis as the carriage end parts $e^1$. The adjacent end parts $e^1$ are closely drawn together and connected by clamps $t$ or the like, so that they form a carriage unit and are adjusted in exactly the same direction at the negotiating of curves during the travel. In order that the coupling rods $i^1$ have always the same direction as the corresponding carriage parts $e^1$, stops A are adjustably fixed on the frame F or the end part $e^1$ which stops prevent in their effective position any lateral movement of the coupling rods $i^1$ with respect to the carriage end parts.

The end faces of adjoining carriage parts $e^1$ may be open so that a large platform is formed. It is obvious that such parts $e^1$ must be adjustable in exactly the same height even in travelling through negotiating curves, for instance if one carriage has already entered the inclined curve rails, while the next carriage still runs on the horizontally disposed straight rails. For this purpose, the springs E are interposed between the bogies $d^1$ and the cabins $e^1$. Such springs are dispensable in case that the corresponding end parts are flexibly bridged by gangway bellows as shown in Figs. 1 and 4. The carriage end parts are supported by means of studs $n$ of the frame F which are slidable upon circular slideway S of the bogies $d^1$.

If a carriage of the type shown in Figs. 2 and 3 is running at the top or end of a train, the extreme end part cannot be slidable upon its bogie but it must be rigidly connected to same so that its longitudinal axis is adjusted according to that of the bogie. For this purpose, stops $A^1$, pivotally mounted on the bogie, fix in their effective position the coupling rod $i^1$ in the bogie which rod $i^1$ in turn is fixed on the frame F by means of the stops A so that cabin $e^1$, bogie $d^1$, and coupling rod $i^1$ are rigidly connected to each other.

The car as shown in Figs. 2 and 3 on the left represents a motor car and has a motor D in the foremost carriage part $e^1$ of the train. This part $e^1$ has both the stops $A^1$ and A in their effective position and is thereby rigidly connected with its bogie $d^1$ and coupling rod $i^1$. The rear end $e^1$ of the same carriage has only the stops A in effective position, whereas the stops $A^1$ are turned into their "out" position so that the cabin $e^1$, together with the coupling rod $i^1$, is horizontally movable about the pivot B of the bogie $d^1$. Of course, instead of the construction of the head part $e^1$ of the train as shown in Figs. 2, 3 and 5 the platform $e^1$ may be fixed to its bogie $d^1$ in any other convenient manner or may be rigidly connected with the bogie as more clearly shown in Fig. 1.

Any desired intermediate solutions between the forms of construction shown in Figs. 1 and 3 and in Figs. 2 and 4 respectively are evidently possible. However, the constructions with similar platforms on the two ends of the central carriage part are preferable owing to their many sided applicability. It may be further mentioned that the train ends, instead of being hingedly connected to the central carriage parts, might be rigidly connected with the same and must in this case be evidently positioned closer thereto.

Fig. 6 shows a simple connection of central carriage part $a$ and outer end part $e$. The mutual rotation of the two parts takes place around the pivot $b$. Besides this the central carriage part $a$ may be slidably supported on the extension of the bogie at $p$.

Figure 7:
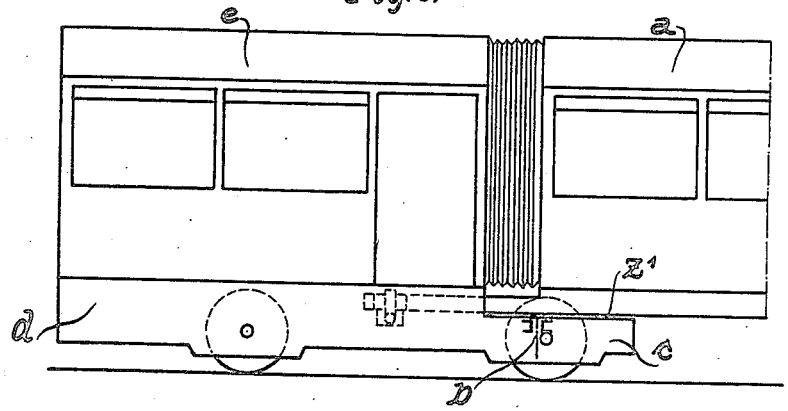
Figure 8:
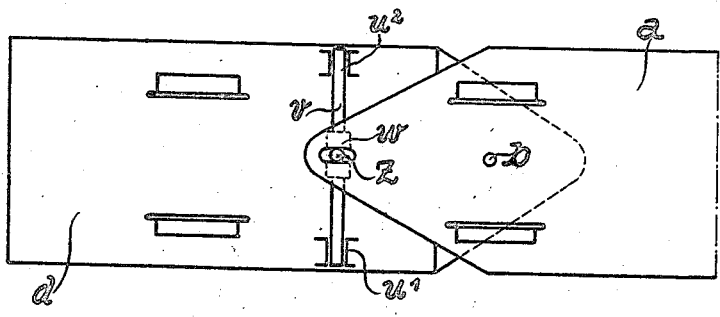

In the form of construction shown in Fig. 7 in side elevation and in Fig. 8 in a diagrammatical top plan view the rotation takes place also around the pivot axle $b$, which is however displaced towards the inner end of the bogie. In order to avoid one sided loading the under frame of the central carriage part $a$ is extended beyond the center of the bogie and connected with the same by means of a stud $z$, a sliding body $w$, a shaft $v$ and spring supported bearings $u^1$ and $u^2$, preferably connected by an equalizer. At turning in the track curves the sliding body $w$ is shifted on the shaft $v$, a longitudinal slot in the extension of the central carriage part $a$ permitting of the corresponding displacements of the stud $z$. If necessary the central carriage part $a$ might be slidably supported on the bogie at another point, for instance $z^1$.

Figure 9:
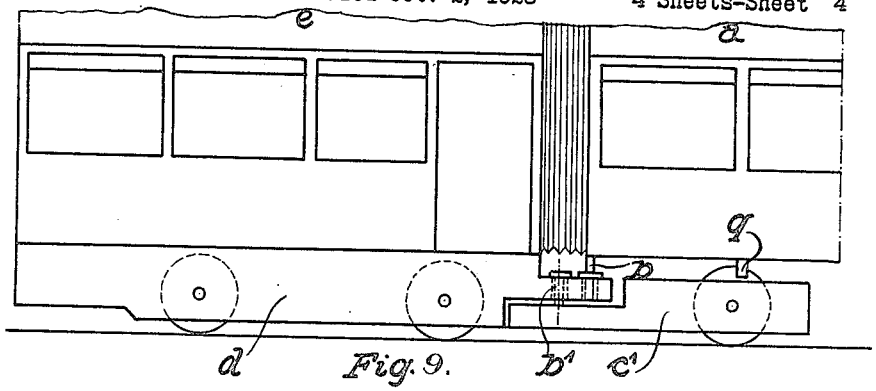

Fig. 9 shows a bogie $d$, $c^1$ having three axles. The third axle is constructed as a Bissel-bogie $c^1$ adapted to pivot in the bogie itself around a stud $b^1$. The central part $a$ of the carriage rests also in this case on a pivot pin $b$ on the outer end of the carriage. In accordance with the desired loading equalization the central part of the carriage might for instance bear on the bogie not only at $b$ but also by means of stud $q$. This supporting may take place either on the main frame of the bogie or directly on the Bissel-bogie $c^1$.

Figure 10:
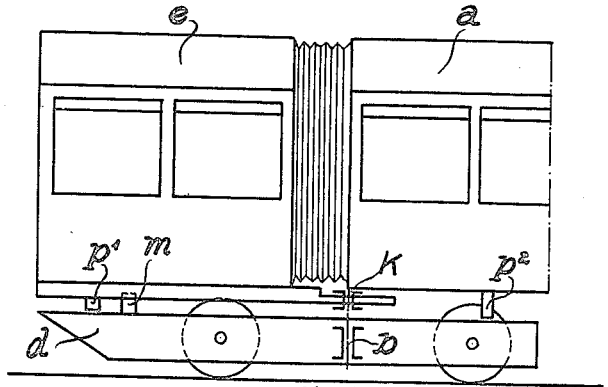

In Fig. 10 the outer carriage end $e$ is hingedly connected to the central part $a$ of the carriage in the joint $k$. The bogie serves in the first instance not for supporting the car end $e$ but for the true curve-adjusting of the same by means of the catch $m$. There might however also be a support between the hingedly connected carriage and the bogie, for instance at $p^1$. The central carriage part $a$ may also bear on the bogie, besides at the bearing $b$, by means of sliding connections $p^2$. The two joints $b$ and $k$ need not be situated in a vertical line the one above the other.

Figure 11:
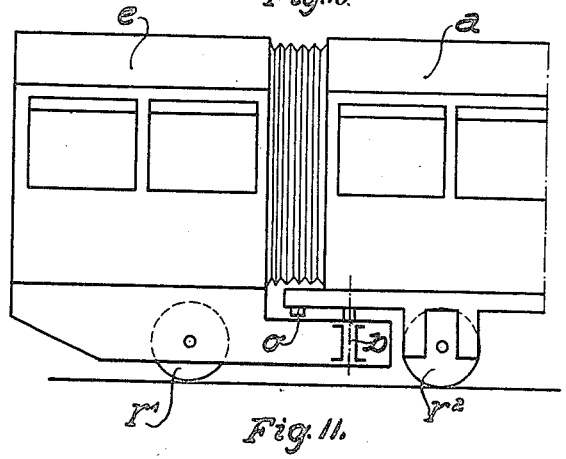

In the form of construction shown in Fig. 11 only one axle $r^1$ is mounted adjustable in curves, the second axle $r^2$ being rigidly mounted or having merely clearance in lateral direction and being eventually in positive connection with the axle adjustable in curves. The outer end of the carriage may be rigidly connected with the bogie. It may also be pivotally mounted thereon by means of a catch and sliding studs and connected to the central part through a joint according to Fig. 9. The combination is further possible that the outer carriage end is hingedly connected to the central carriage part, but also at the same time supported on the bogie. There might also be provided a support $o$ for the central part $a$ of the carriage on the Bissel-bogie.

The new passenger carriage has carriage end parts of similar construction and it is distinguished by great flexibility in the curves. Shocks produced by the permanent way and vibrations caused by the driving motor are kept away from the unsupported central carriage body by the spring-suspended bogies of the outer end parts of the carriage.

I claim:—

1. A car for transporting passengers or freight particularly a car adapted to run on rails, comprising in combination, bogies, end parts of the car supported by said bogies, a central part of the car pivotally mounted between two bogies, means between the end parts and the central part of the car adapted to form a passageway.

2. A car for transporting passengers or freight, particularly a car adapted to run on rails, comprising in combination, bogies, running gears on said bogies, end parts of the car supported at their inner ends by said bogies, a central part of the car pivotally mounted upon two of the bogies, folding bellows between the end parts and the central part of the car.

3. A car for transporting passengers or freight, particularly a car adapted to run on rails, comprising in combination, bogies, end parts of the car supported at their inner ends by said bogies, a central part of the car pivotally mounted upon two of the bogies, supporting members on the underside of the said central part, slideways on said bogies, adapted to support the central part, folding bellows between the end parts and the central part of the car.

4. A car for transporting passengers or freight, particularly a car adapted to run on rails, comprising in combination, bogies, end parts of the car pivotally mounted at their inner ends on said bogies, a central part of the car pivotally arranged between two of the said bogies, supporting members on the underside of said end parts and central part, slideways on said bogies to support the end parts and the central part, folding bellows between the end parts and the central part of the car.

5. A car for transporting passengers or freight, particularly a car adapted to run on rails, comprising in combination, bogies, running gears on said bogies, end parts of the car pivotally mounted at their inner ends on said bogies, a central part of the car pivotally arranged between two of the said bogies, supporting members on said end parts and central part, slideways on said bogies, stops on said end parts, adapted to secure same against radial displacement on their bogies, folding bellows between the said end parts and the central part.

6. A car for transporting passengers or freight, particularly a car adapted to run on rails, comprising in combination, bogies, supporting frames pivotally mounted at their inner ends on said bogies, end parts of the car yieldingly supported by said frames, a central part pivotally arranged between two of the said bogies, folding bellows between the end parts and the central part.

7. A car for transporting passengers or freight, particularly a car adapted to run on rails, comprising in combination, bogies, end parts of the car mounted on said bogies, a central part pivotally arranged between two of the said bogies, folding bellows between the end parts and the central part, means on said car, adapted to connect several cars to form a train.

8. A car for transporting passengers or freight, particularly a car adapted to run on rails, comprising in combination, bogies, end parts of the car mounted on said bogies, a central part pivotally arranged between two of the said bogies, coupling rods on said bogies, means on said end parts adapted to connect the end parts of two successive cars.

9. A car for transporting passengers or freight, particularly a car adapted to run on rails, comprising in combination, bogies, end parts of the car pivotally mounted on said bogies, a central part pivotally arranged between two of the said bogies, coupling rods in said bogies, clamps on said end parts adapted to connect the end parts of two successive cars directly.

10. A car for transporting passengers or freight, particularly a car adapted to run on rails comprising in combination, bogies, running gears on said bogies, end parts of the car pivotally mounted on said bogies, a central part of the car pivotally arranged between two of the said bogies, folding bellows between the end parts and the central part, coupling rods on said bogies, adapted to connect several cars to form a train, clamps on said end parts, the end parts of two successive cars connected together directly, stops on said end parts adapted to embrace the coupling rods.

In testimony whereof I affix my signature.

CARL BUDERUS.